(12) United States Patent
Wohlgemuth et al.

(10) Patent No.: US 10,488,235 B2
(45) Date of Patent: Nov. 26, 2019

(54) MEASURING TUBE FOR A MAGNETO-INDUCTIVE FLOW MEASURING DEVICE AND MAGNETO-INDUCTIVE FLOW MEASURING DEVICE

(71) Applicant: Endress + Hauser Flowtec AG, Reinach (CH)

(72) Inventors: Werner Wohlgemuth, Seeven (CH); Frank Voigt, Weil am Rhein (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 321 days.

(21) Appl. No.: 15/103,008

(22) PCT Filed: Nov. 14, 2014

(86) PCT No.: PCT/EP2014/074624
§ 371 (c)(1),
(2) Date: Jun. 9, 2016

(87) PCT Pub. No.: WO2015/090760
PCT Pub. Date: Jun. 25, 2015

(65) Prior Publication Data
US 2016/0305803 A1    Oct. 20, 2016

(30) Foreign Application Priority Data

Dec. 19, 2013    (DE) .................. 10 2013 114 428

(51) Int. Cl.
*G01F 1/58*    (2006.01)

(52) U.S. Cl.
CPC .................. *G01F 1/584* (2013.01)

(58) Field of Classification Search
CPC ..... G01F 1/64; G01F 1/56; G01F 1/74; G01F 1/78; G01F 1/58; G01F 1/60; G01F 1/582;
(Continued)

(56) References Cited

U.S. PATENT DOCUMENTS 3,213,685 A    10/1965    Mannherz
5,773,723 A *  6/1998    Lewis ................ G01F 1/58
                                                138/133

(Continued)

FOREIGN PATENT DOCUMENTS

CN    2125818 U    12/1992
CN    2669143 Y    1/2005
(Continued)

OTHER PUBLICATIONS

International search report, dated Mar. 4, 2015, PCT/EP2014/074624, pp. 1-2.*
(Continued)

*Primary Examiner* — John Fitzgerald
*Assistant Examiner* — Truong D Phan
(74) *Attorney, Agent, or Firm* — Bacon & Thomas, PLLC

(57) ABSTRACT

A measuring tube for a magneto-inductive flow measuring device, comprising a support tube, a liner arranged in the support tube and a reinforcement structure embedded in the liner. A helical contour is arranged between the support tube and the reinforcement structure. And a magneto-inductive flow measuring device having such a measuring tube.

9 Claims, 11 Drawing Sheets

(58) Field of Classification Search
CPC .......... G01F 1/588; G01F 1/584; G01P 5/006;
G01P 5/08; F17C 9/00; F17C 13/026
USPC .......................................... 73/861.08–861.17
See application file for complete search history.

(56) References Cited

U.S. PATENT DOCUMENTS

| | | | |
|---|---|---|---|
| 8,397,585 B2* | 3/2013 | Iijima | G01F 1/582 |
| | | | 73/861.11 |
| 9,175,992 B2 | 11/2015 | Iijima | |
| 2002/0033054 A1* | 3/2002 | Frey | G01F 1/586 |
| | | | 73/861.12 |
| 2003/0159522 A1* | 8/2003 | Needham | G01F 1/584 |
| | | | 73/861.11 |
| 2006/0083941 A1* | 4/2006 | Lorenz | G01F 1/8404 |
| | | | 428/544 |
| 2006/0096391 A1* | 5/2006 | Kappertz | G01F 1/588 |
| | | | 73/861.357 |
| 2009/0178489 A1* | 7/2009 | Iijima | G01F 1/58 |
| | | | 73/861.11 |

FOREIGN PATENT DOCUMENTS

| | | |
|---|---|---|
| CN | 10 1103255 A | 1/2008 |
| CN | 10 1487727 A | 7/2009 |
| CN | 10 1925802 A | 12/2010 |
| DE | 102004048765 A1 | 4/2006 |
| DE | 69634969 T2 | 6/2006 |
| DE | 102010020768 A1 | 11/2010 |
| EP | 0581017 A1 | 2/1994 |
| WO | 2015090760 A1 | 6/2015 |

OTHER PUBLICATIONS

International Search Report, EPO, The Netherlands, dated Mar. 4, 2015.
English Translation of the International Preliminary Report on Patentability, WIPO, Geneva, CH, dated Jun. 30, 2016.

* cited by examiner

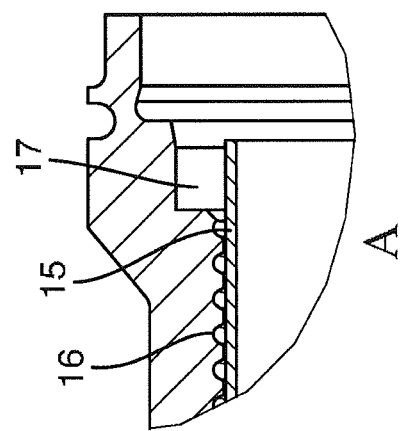
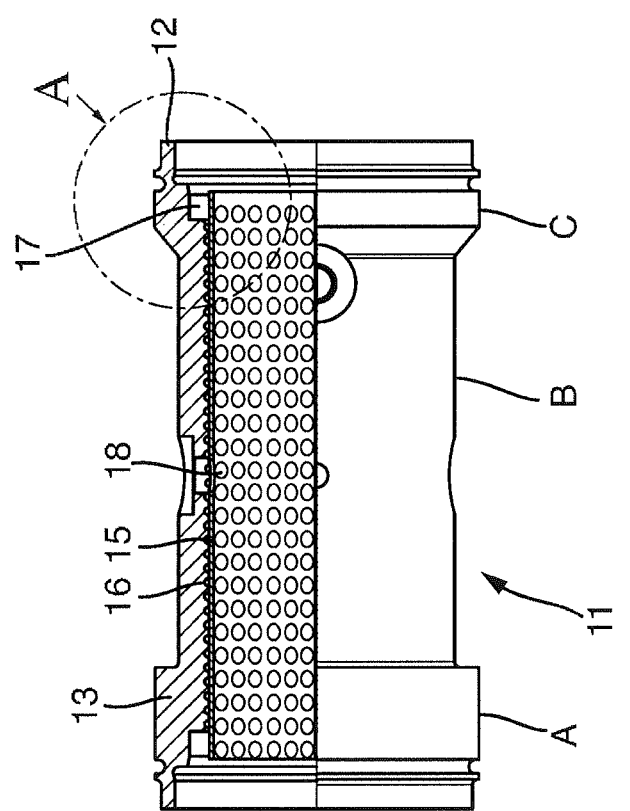
Fig. 2
Fig. 2A

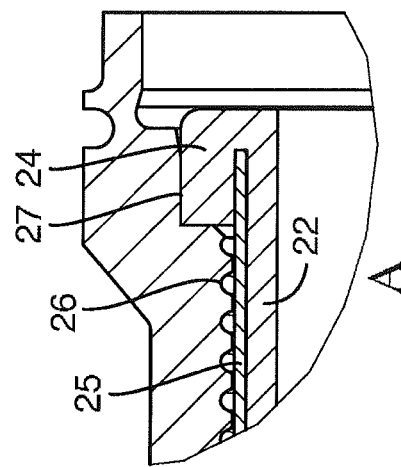
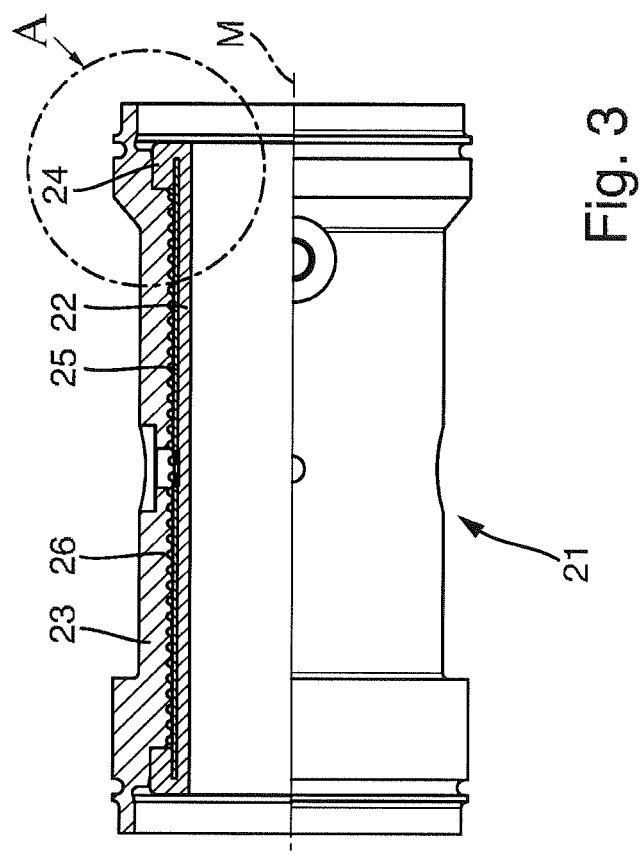

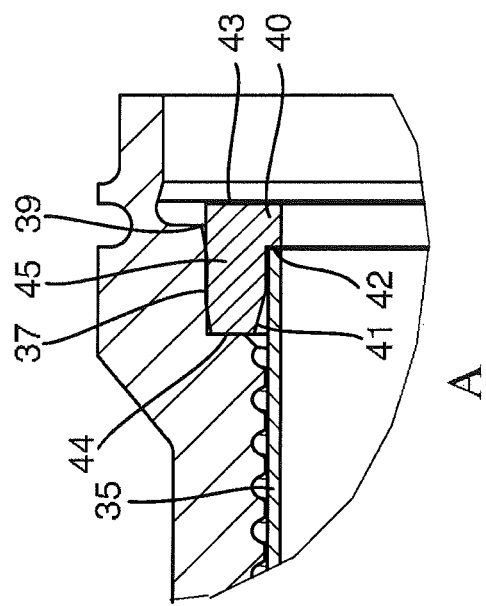
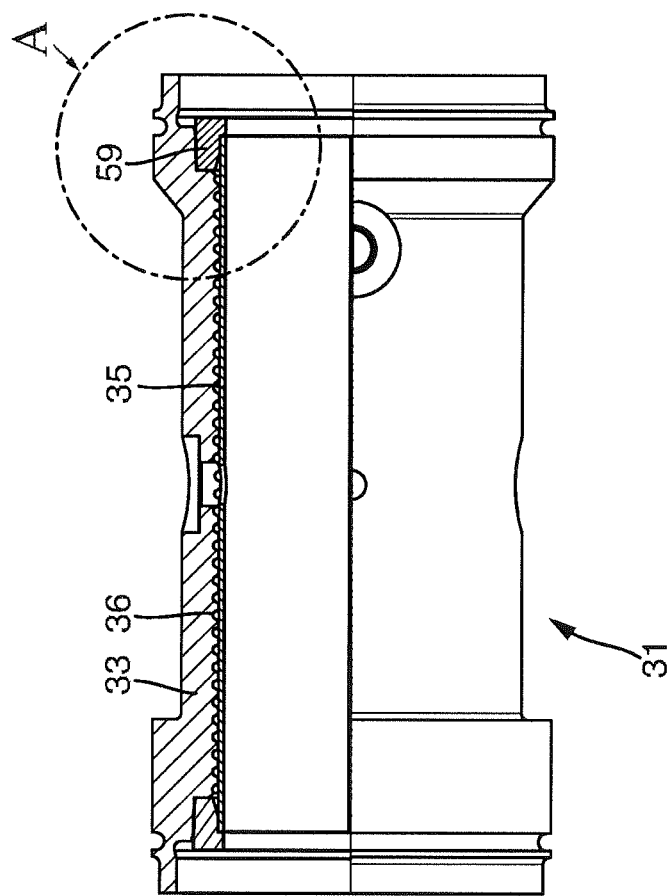

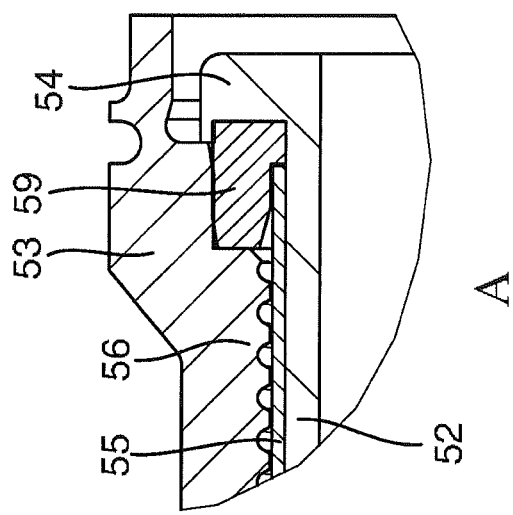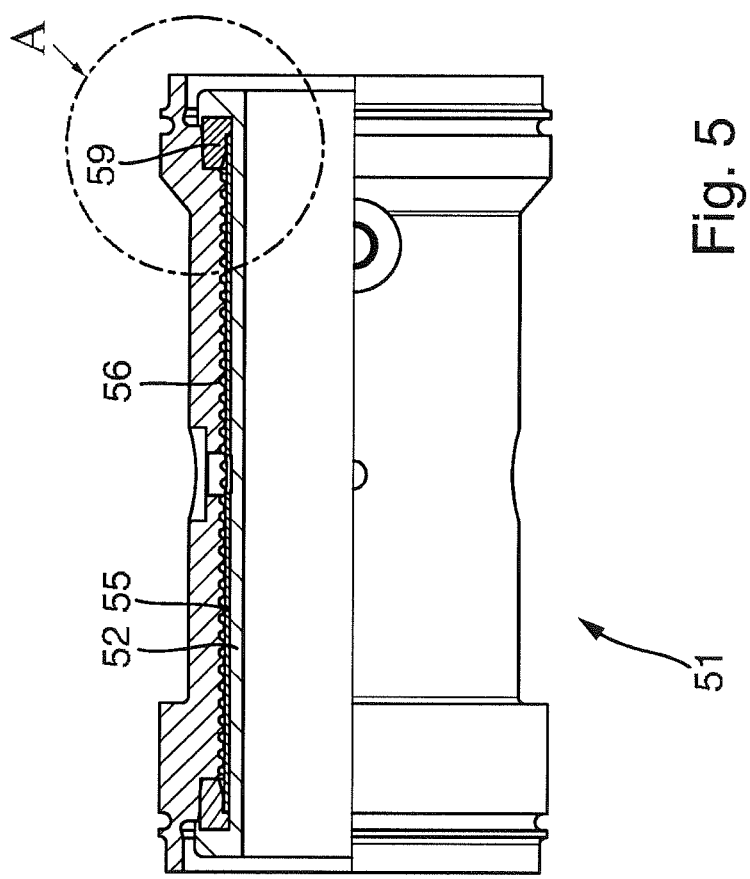

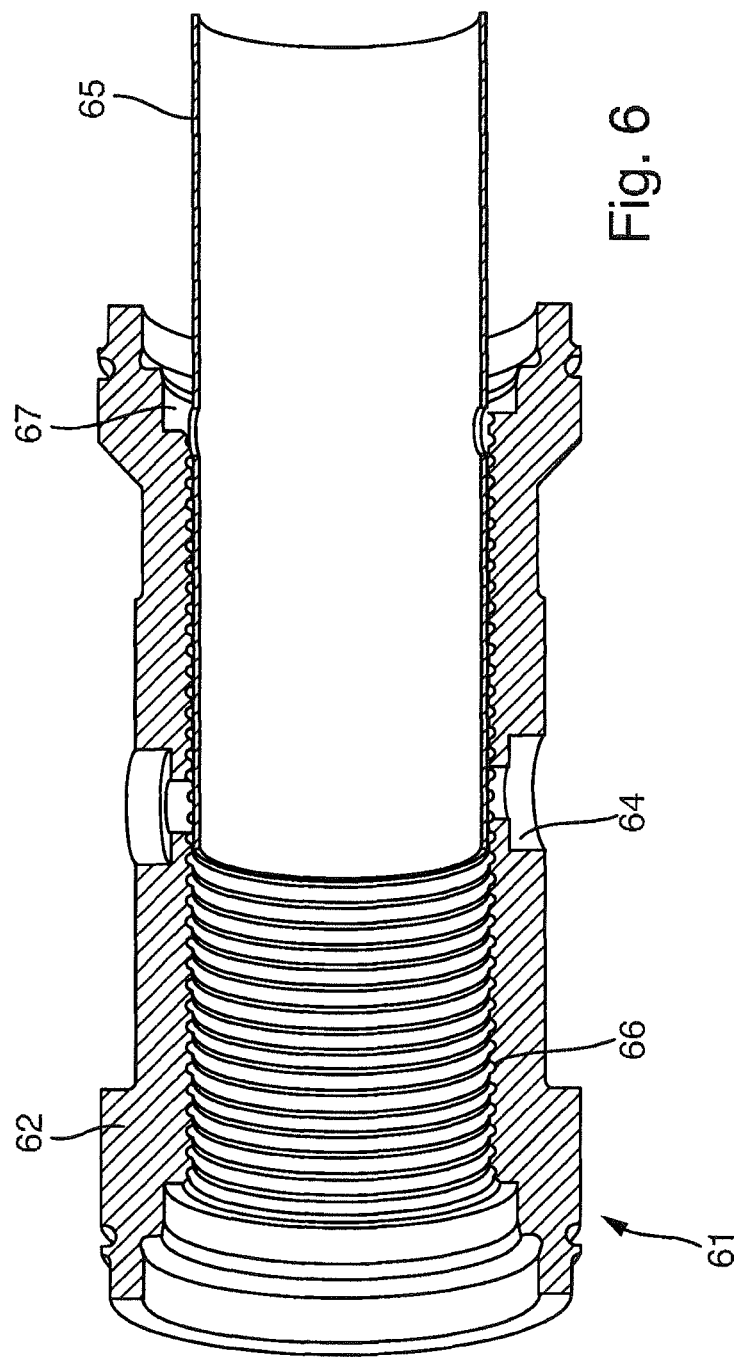

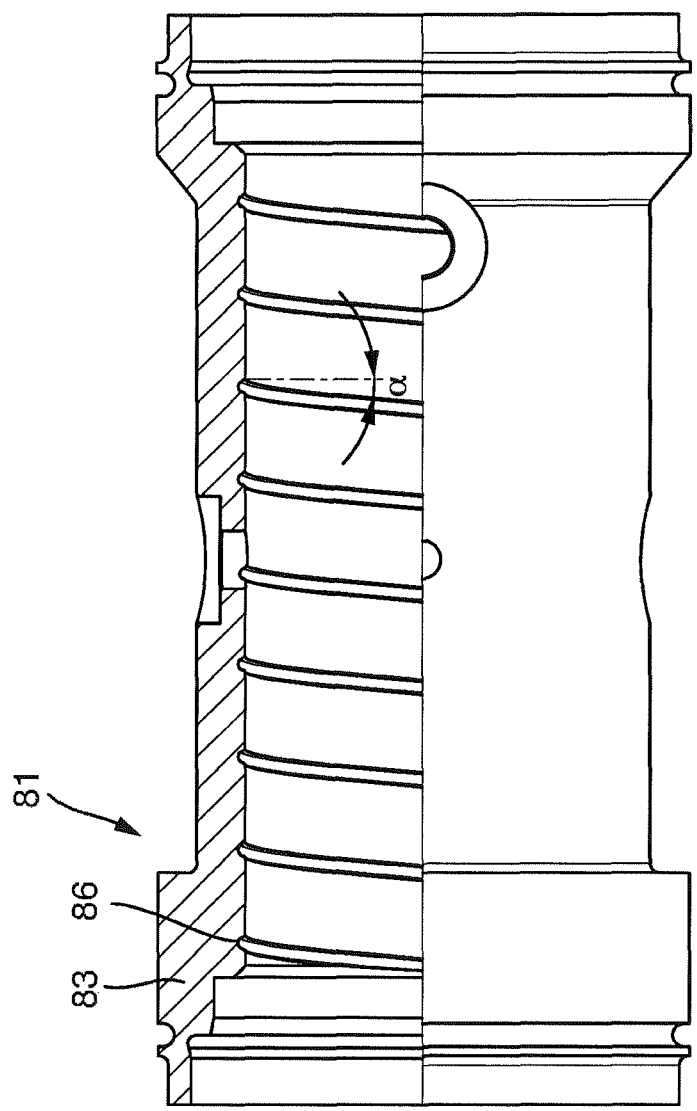

MEASURING TUBE FOR A MAGNETO-INDUCTIVE FLOW MEASURING DEVICE AND MAGNETO-INDUCTIVE FLOW MEASURING DEVICE

TECHNICAL FIELD

The present invention relates to a measuring tube and a magneto-inductive flow measuring device.

BACKGROUND DISCUSSION

In the case of measuring tubes for magneto-inductive flow measuring devices, measuring tubes of plastic are known but, for most part, measuring tubes with a support tube of metal, especially of steel, are used. In the latter case, however, there is the problem that the material of the measuring tube is conductive. In order to enable a voltage to be tapped on the measuring electrodes, the measuring tube must be electrically insulated. For this, usually an insulating plastic layer, a so called liner, is used. The adhesion of such materials to the metal surface is, however, not optimal. Additionally, the liner can under process conditions be mechanically deformed Therefore, a perforated sheet is inserted, which serves the liner material as reinforcement means. This reinforcement means is inserted into the support tube and reinforces the liner material. German Patent, DE 10 2008 054 961 A1 of the applicant discloses a number of possible variants of such a perforated sheet, for example, a sheet which has only a segment-wise perforating.

A major topic is the anchoring of the liner in the support tube. An anchoring opportunity is described in the aforementioned DE 10 2008 054 961. In such case, the reinforcement means is fixed to the measuring tube by a press-fit, so that the reinforcement means is fixed in the support tube only by compression, however, without a material bonded connection.

This variant has basically proved itself as practical and cost effective and can be done with little manufacturing effort. However, over longer periods of time, the compressive stress of the perforated sheet can lessen and the liner can then turn in the measuring tube.

Another opportunity for anchoring is described in German Patent, DE 10 2006 018 415 A1. In such case, of concern are two reinforcement means manufactured as half shells, which can be manufactured as perforated sheets. These are secured terminally to the measuring tube with material bonded connection via welding tabs.

The welding of a perforated sheet has the disadvantage that, most often, only little space is left between the perforated sheet and the support tube for the casting of the liner material behind. In the case of temperature differences between perforated sheet and support tube, thermal expansion differences can lead to loosening of the weld locations over longer periods of operation.

A lattice for reinforcement of the liner is additionally disclosed in U.S. Pat. No. 5,773,723 A1 and US 2008/0196510 A1 likewise embodied as a reinforcement means in the form of a perforated sheet or lattice in a support tube. The function of reinforcement is also described therein. As can be seen from the figures, these reinforcement means have, however, no anchoring to the support tube but, instead, are embedded in the liner without anchoring.

In the case of rubber liners, PFA or PTFE liners, these form as is known only extremely weak adhesive bonds to the carrier measuring tube. An undesired twisting of the liner in the measuring tube in the case of longer use is, consequently, probable, the more so since no additional anchorings of the liner are provided.

An alternative opportunity of support for the perforated sheet is described in European Patent, EP 1 039 269 A1. In such case, a sintered material is distributed continuously in the support tube and forms a tubular reinforcement means, which extends almost completely over the inner surface of the support tube. The material of the lining can penetrate and anchor in the pores of the loose, granular, respectively foam like, sintered material. The sintering provides an especially good bonding of the supporting sintered material to the steel support tube.

The sintered material is, however, comparatively expensive and additionally complexly implementable in the production process.

SUMMARY OF THE INVENTION

Starting from the aforementioned state of the art, it is an object of the present invention to provide a measuring tube for a magneto-inductive flow measuring device, in the case of which an alternative, cost effective and more reliable anchoring of a liner in the support tube is implemented.

The present invention achieves this object by a measuring tube and by a magneto-inductive flow measuring device.

A measuring tube of the invention for a magneto-inductive flow measuring device includes a support tube, a liner arranged in the support tube and a reinforcement means embedded in the liner, wherein a helical contour is arranged between the support tube and the reinforcement means.

The helical contour has the advantage that radial twisting in the case of simultaneous axial locking of the liner is prevented. Thus, measurement error is prevented.

The helical contour can be provided by the inner surface of the support tube or as a special component, e.g. a helical contour can be introduced. A helical contour can in the former case be brought about directly by a screw tap.

The special component can be secured by welding, brazing, soldering or by spring force, thus return forces following deformation of the support tube.

The liner can be pressed against the profiling or, especially advantageously, be present in depressions of the helical contour. In latter case, additional guarding against an axial shifting of the liner results.

Also implementable without problem are twist safe arrangements in the case of special measuring tube constructions. Thus, the measuring tube can have a smaller inner diameter toward the half length of the measuring tube than in the inlet- or outlet regions. In the case of lessening of the inner diameter of the measuring tube, likewise the inlet path before the measuring tube can be lessened. Complex foundation constructions are not required for these cases.

The recessing of the helical contour in the radial direction can be at least 0.2 mm. This has the advantage of an especially secure connecting of the liner into the contour.

The slope (pitch/$2\pi r$) of the helical contour can be preferably 0.25%-7%. A slope, which is too large, can lead to a small number of helical revolutions of the contour, which leads to a lessening of the adhesion of the liner in the depressions. A slope, which is too low, can lead to a skipping of the helical revolutions.

Twisting can be prevented by axial blocking of the liner material or of the reinforcement means. It is, however, advantageous, when the reinforcement means is blocked in its axial movement, since the reinforcement means is of a harder material and, thus, shearing motions are not possible.

The measuring tube can advantageously have terminal support bushings of sintered material, which prevents axial movement of the reinforcement means.

Alternatively or supplementally, the support tube can be covered on each end with a bead of liner material, which forms a stop for a process connection.

An especially favorable combination results, when one combines the support bushing with the aforementioned bead of material. In this way, compared with a pure bead of the material a mechanically stable sealing strip can be created. Therefore, it is advantageous, when the connection surface of each terminal support bushing, with which the measuring tube is connectable to a process connection, is partially or completely covered with the bead of liner material.

The reinforcement means can especially preferably be embodied as a perforated sheet, especially a cylindrical perforated sheet. The perforations need, however, not be continuous, but, instead, only perforated regions can be provided.

BRIEF DESCRIPTION OF THE DRAWINGS

The subject matter of the invention will now be explained in greater detail based on a number of examples of embodiments. The figures of the drawing show as follows:

FIG. 1A is a detail view of FIG. 1;

FIG. 2 is a sectional view of a second intermediate product for manufacture of a first measuring tube for a magneto-inductive flow measuring device;

FIG. 2A is a detail view of FIG. 2;

FIG. 3 is a sectional view of a first embodiment of a measuring tube for a magneto-inductive flow measuring device;

FIG. 3a is a detail view of FIG. 3;

FIG. 4 is a sectional view of a third intermediate product for manufacture of a measuring tube for a magneto-inductive flow measuring device;

FIG. 4A is a detail view of FIG. 4;

FIG. 5 is a sectional view of a second embodiment of a measuring tube for a magneto-inductive flow measuring device;

FIG. 5A is a detail view of FIG. 5;

FIG. 6 is a perspective view of a fourth intermediate product for manufacture of a measuring tube;

FIG. 9 is a sectional view of a fourth intermediate product in the case of manufacture of a measuring tube;

DETAILED DISCUSSION IN CONJUNCTION WITH THE DRAWINGS

Figure 8:
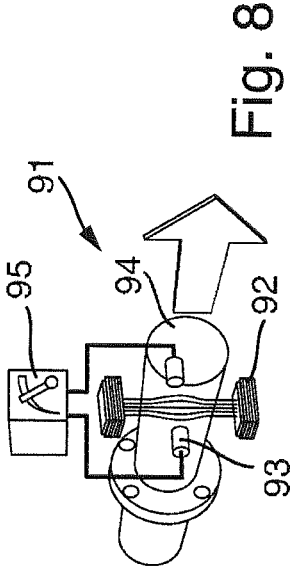
FIG. 8 is a schematic representation of a magneto-inductive flow measuring device according to the state of the art.
Figure 10C:
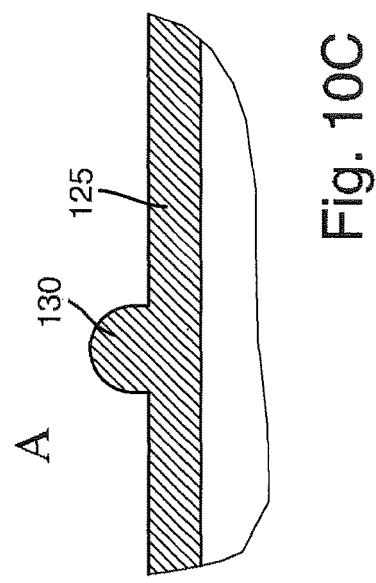
FIG. 10C is a detail view of a reinforcement means of the fifth intermediate product of FIG. 10A.
Figure 10A:
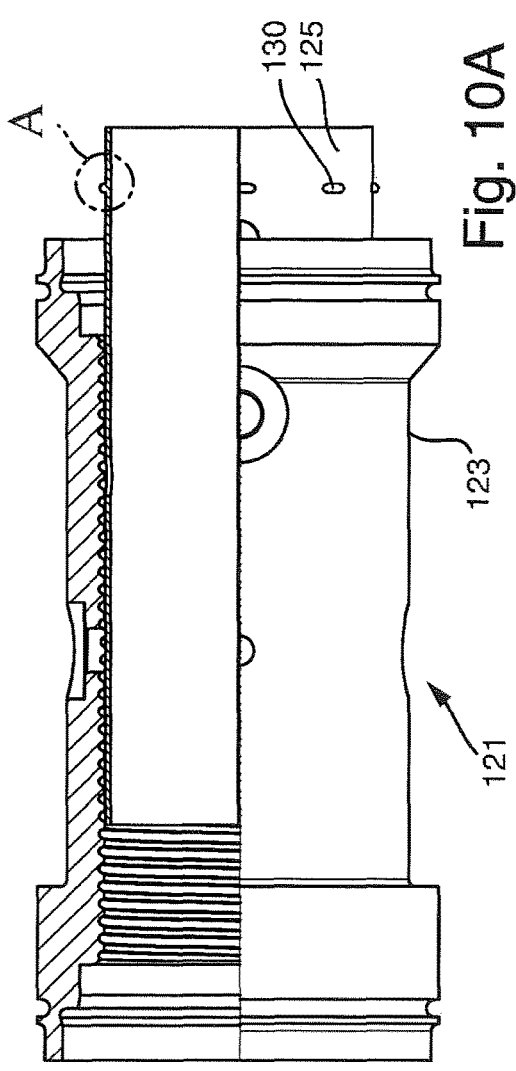
FIG. 10A is a sectional view of a fifth intermediate product in the case of manufacture of a measuring tube.
Figure 10B:
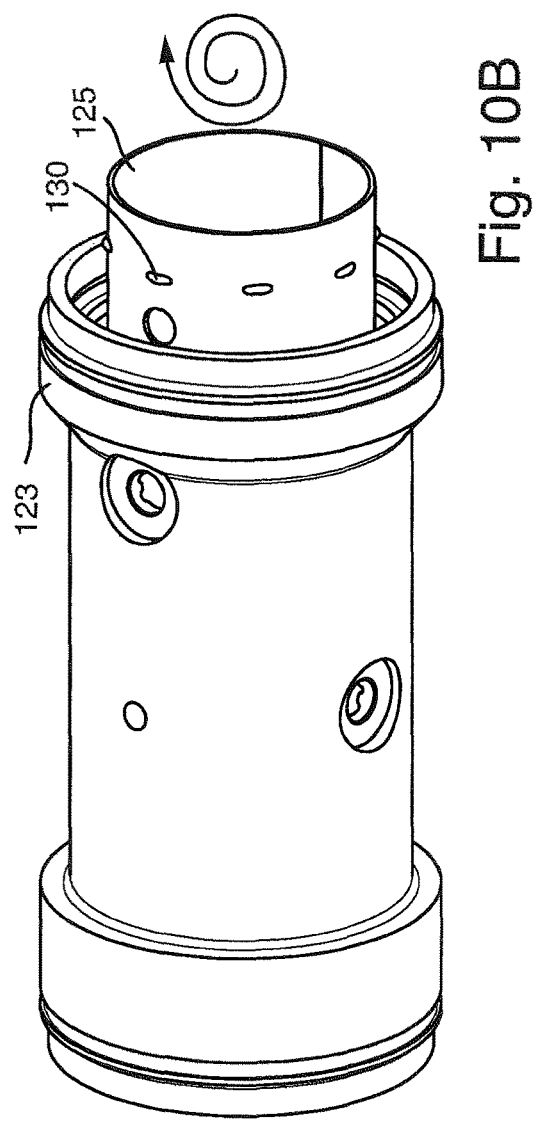
FIG. 10B is a perspective view of the fifth intermediate product of FIG. 10A.
Figure 10D:
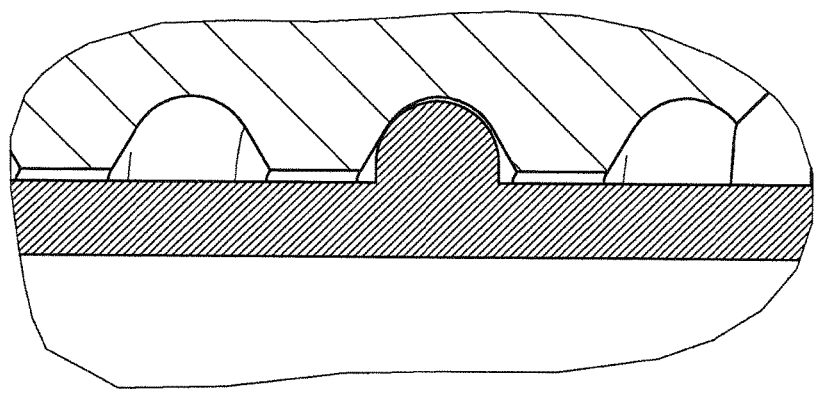
FIG. 10D is a detail view of a reinforcement means and a support tube of FIG. 10A.

The construction and measuring principle of a magneto-inductive flow measuring device 91 is basically known and is schematically presented in an example shown in FIG. 8. According to Faraday's law of induction, a voltage is induced in a conductor moved in a magnetic field. In the case of the magneto-inductive measuring principle, the flowing, measured medium corresponds to the moved conductor and flows with a flow velocity v through a measuring tube 94. A magnetic field B of constant strength is produced by two field coils 92 on two opposing sides of a measuring tube 94. Located perpendicularly thereto on the tube inner surface of the measuring tube 94 are two measuring electrodes 93, which tap the voltage $U_e$ produced when the measured medium flows through the measuring tube 94. The separation of the measuring electrodes is referred to with L. The induced voltage $U_e$ is proportional to the flow velocity v and therewith to the volume flow Q of the measured medium, which can be calculated by an evaluation unit 95. The magnetic field B produced by the field coils 92 results from a clocked direct current of electrical current level I with alternating polarity. This assures a stable zero-point and makes the measuring insensitive to influences of multiphase materials, inhomogeneities in the liquid or lesser conductivity. Magneto-inductive flow measuring devices with coil arrangements with greater than two field coils and other geometrical arrangements are known.

In the case of measuring tubes for magneto-inductive flow measuring devices, measuring tubes of plastic are known but, for the most part, measuring tubes with a support tube of metal, especially of steel, are used. In the latter case, however, there is the problem that the material of the measuring tube is conductive. In order to be able to tap a voltage on the measuring electrodes, the measuring tube must be electrically insulated. For this, usually an insulating plastics layer, a so called liner, is used.

Various liner materials for these purposes are known to those skilled in the art. Suitable liner materials include PUR, PTFE, PFE and rubber materials, such as rubber, especially vinyl rubber. The adhesion of these materials to the metal surface is, however, not optimal. Additionally, the liner material can deform.

Therefore, a perforated sheet is applied, which serves the liner material as a reinforcement means. This reinforcement means is inserted into the support tube and supports the liner material. DE 10 2008 054 961 A1 of the applicant discloses a number of possible embodiments of such a perforated sheet, for example, a sheet which has perforations only in certain of its segments. The perforated sheet can, however, also be continuously perforated, such as shown herein e.g. in FIG. 2.

An important topic is the anchoring of the liner in the support tube. One opportunity for anchoring the liner is shown in FIG. 3.

FIG. 3 shows a first example of an embodiment of a measuring tube 21 of the invention. Measuring tube 21 has a measuring tube axis M and includes a support tube 23. This is preferably a solid tube of metal, manufactured especially preferably of steel, especially stainless steel. The material of the support tube is, however, not exclusively limited to metal materials.

Support tube 23 includes an inner surface facing the measuring tube axis M and having a helical contour 26.

The helical contour 26 can alternatively also be provided by a separate component arranged against the inner surface of a supporting tube. Serving for this can be a spring element or an insert present in the supporting tube and, especially preferably, connected with the supporting tube. The unit formed by the separate component, e.g. the spring element or insert, and the supporting tube comprise a support tube in the sense the invention.

The helical contour includes, such as is naturally usual in the case of a screw thread, a recessed portion. This recessed region or depression can be embodied e.g. as an encircling groove, analogously to a screw thread. In the case of a spring element, the recessed region is embodied wider than in the case of a usual groove of a screw. A property of a helix is its slope, with which the revolution of the helix propagates in the direction of an axis, here the measuring tube axis M.

In the radial direction toward the measuring tube axis M, the support tube includes a reinforcement means 25, which is preferably cylindrically embodied. Reinforcement means 25 can be embodied, for example, as a lattice or network. A preferred embodiment of a reinforcement means 25 is a sheet, which has perforations at least in certain regions.

In an especially preferred embodiment, the sheet is a perforated sheet, in the case of which perforations are distributed over the entire length of the perforated sheet. In this way, a unified binding of the perforated sheet in a liner layer 22 is guaranteed.

Reinforcement means 25 preferably includes material interruptions. In the case of sheet metal, the material interruptions are holes in the sheet metal. In the case of networks or lattices, the material interruptions are meshes.

The liner is especially composed of a potting material. Terminally arranged on both ends of the reinforcement means 25 are thickenings 24 of the material of the liner. The reinforcement means 25 is terminally framed in the thickenings 24.

In FIG. 3, the reinforcement means 25 lies against the helical contour 26. It is, however, also possible to space the reinforcement means 25 from the helical contour 26. This separation can, depending on nominal diameter of the measuring tube 32, vary from a few μm to several millimeters.

FIGS. 1-8 are only schematic representations. The recess of the helical contour 26 is likewise partially or completely filled with liner material. In the embodiment of FIG. 3, in which the reinforcement means 25 is embodied as a sheet, the holes of the sheet are filled with liner material. In the case of a potting material as liner material, thus, the liner material is cast around the sheet. In this way, an especially favorable binding of the reinforcement means 25 in the liner 22 is achieved.

To the extent that a process line is connected to the measuring tube 21, the process line abuts against the thickened material 24. At the same time, axial movement of the liner material is blocked. An axial shifting of the liner 22 and the reinforcement means 25 relative to the support tube 23 is, consequently, excluded.

Because of the helical contour 26 in combination with the axial locking of the liner material 22, also no twisting of the liner in the measuring tube can occur, since twisting motion of the composite of liner material and reinforcement means in the recess is likewise blocked in the case of axial locking due to the slope of the continuing recess.

The helical contour enables, thus, compared with previous solutions, a cost effective and at the same time reliable means for preventing twist of the liner material 22 and of the reinforcement means 25 in the support tube 23.

Figure 1:
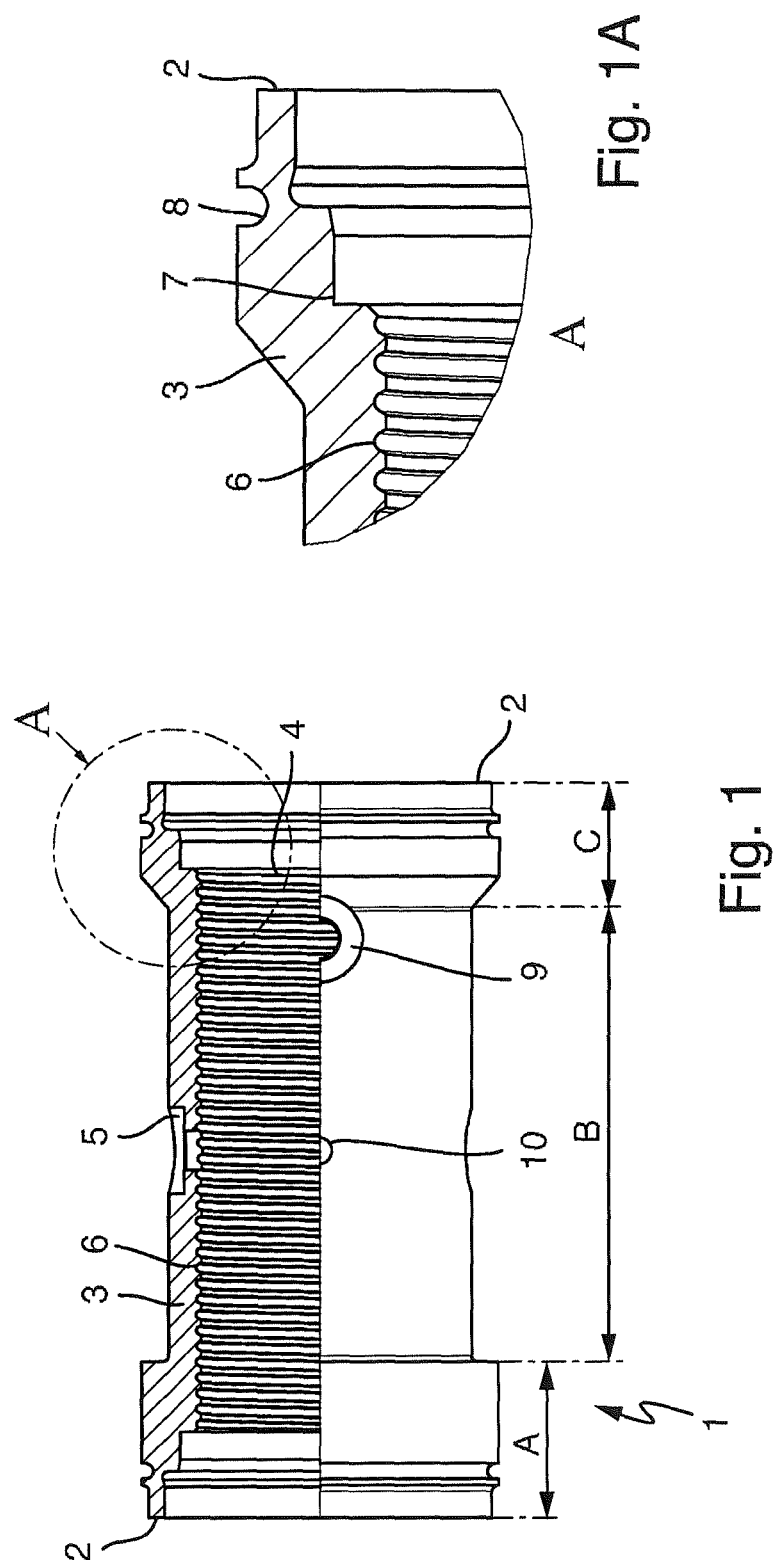
FIG. 1 is a sectional view of a first intermediate product for manufacture of a first measuring tube for a magneto-inductive flow measuring device.

FIGS. 1 and 2 show individual intermediate products in the case of manufacture of the aforementioned measuring tube.

FIG. 1 shows an intermediate product 1 having a support tube 3. The support tube has two end segments A and C and a middle segment B. This support tube 3 includes terminally, in each case, formed sections 2 for the connection of process connections. Extending between the structures 2 in at least the middle segment B of the support tube 3 is a helical contour 6. This helically shaped contour 6 can, for example, be introduced into the inner surface of the support tube 3 by means of a thread cutter. Thus, the contour can be thought of as the thread of a nut.

The support tube 3 of FIG. 1 includes anchoring locations 5 and 10 for measuring electrodes and magnet coils of a magneto-inductive flow measuring device. Since the construction and the measuring principle of a magneto-inductive flow measuring device is basically known (see FIG. 8), these components have been omitted, in order not to get in the way of explanation of the core aspects of the invention.

Moreover, support tube 3 of FIG. 1 includes a connection 9 for another electrode, e.g. an MSM electrode, which monitors the fill level of the measuring tube. Known are also MSM electrodes, which can supplementally ascertain the temperature of the medium.

The contour has, such as usual in the case of a helical shape, a slope. This is especially noticeable at the lip 4 of the contour. However, the slope is, in this case, rather small in the schematic representation of FIGS. 1 and 1A.

Moreover, the support tube 3 includes in its end regions widenings 7, here step shaped widenings, of the inner diameter. These regions serve as connection regions, where process connections can be plugged or screwed in. The process connections can supplementally be welded tight. The support tube 3 includes in the end regions additionally surrounding grooves 8 for accommodating sealing rings on its outer surface.

FIG. 2 shows an intermediate product 11 in the case of manufacture of a measuring tube. Included is a support tube 13 embodied essentially with construction equal to that of FIG. 1 with two end segments A and C and a middle segment B, as well as with a helical contour 16, which extends along the inner surface at least in the middle region B of the support tube 13. Inserted in the support tube 13 is a reinforcement means 15—here in the form a perforated sheet. Reinforcement means 25 includes material interruptions 18 in the form of holes. Arranged in the end regions A and C are structures 12 for accommodating process connections.

Additionally, the end regions A and C of the support tube 13 have, in each case, an annular recess 17, so that between the terminal regions of the reinforcement means 15 and the support tube 13 there is an increased separation, compared to the separation in the middle segment B. This increased separation serves for accommodating an increased amount of liner material and/or for accommodating a support ring for support of the axial stop of the liner material.

Starting from the intermediate product 11 of FIG. 2, this can then be provided with a lining layer of liner material 22. This can be introduced as potting material. In such case, the potting material flows through the holes 18 and into the recess of the helical contour 26, 16 or 6. Upon hardening, the liner assumes the shape of the helical contour 6, 16, 26. Thus, liner 22 with the incorporated reinforcement means has after its hardening a shape like a hollow screw.

FIG. 5 shows a second embodiment of a measuring tube 51 of the invention. This includes a support tube 53 with a helical contour 56 on the inner surface. Additionally, the measuring tube 51 includes a reinforcement means 55, which is embedded in a liner 52. The liner penetrates the holes provided in the reinforcement means 55 and extends into the depression of the helical contour 56.

Terminally, the reinforcement means 55 is affixed at its annular ends by means of a cylindrical support bushing 59 in the form of a stop. In this way, axial movement of the reinforcement means 55 and therewith also of the liner 52 is prevented. The support bushing 59 at each end is composed of sintered material. This is advantageous, since the pores of the sintered material offer the liner material a high amount of anchoring surface.

Liner material 54 is likewise arranged on the support bushing 59 in the form of a bead of the liner material. A terminal bead of the material of liner material becoming wider toward the process connection acts as sealing strip. In such case, the liner material is located between the process connection and the support tube 53. Often applied as liner material is an elastomer. In the form of a bead of the material at the above-described position, this acts like a sealing ring and prevents leakage of medium at the interface between measuring tube 51 and process connection.

Support bushing 59 of sintered material gives the sealing strip essentially more mechanical stability than a simple bead of the material, such as e.g. the bead 24 of the liner material in FIG. 3 without corresponding support.

FIG. 4 shows an intermediate product 31 in the case of the manufacture of the measuring tube of FIG. 5. Shown in FIG. 4 is the construction of support tube 33, a reinforcement means 35 and a helical contour 36 located therebetween. The support bushing of sintered material is likewise visible in FIG. 4. A corresponding liner is not yet drawn in FIG. 4. Based on FIGS. 4 and 4*a*, a preferred embodiment of the support bushing of porous material will now be explored in greater detail.

The porous material can be basically a plastic, for example, an open celled plastic foam, or a ceramic, for example, a foamed ceramic, or a sintered metal with pores.

Other than in EP 1 039 269 A1 where the support tube has a lining completely of sintered material, in the case of the embodiment of the present invention here, only support bushings are used, thus an inserted component and no sintered layer in-situ over the entire measuring tube length.

It has surprisingly been discovered that such a terminal support bushing is sufficient for locking the liner to a measuring tube. At the same time, the use of a support bushing means significantly less effort in the manufacture, whereby both time—as well as also cost-savings relative to the applied material result. The support bushing can, in such case, especially be utilized as a specially prefabricated part and does not have to be formed in the support tube.

As is indicated in FIGS. 4 and 5, the sintered socket is introduced into the recess 37 in the end region of the support tube. This enabled advantageously, among other things, a compact execution of the total construction.

The material of the support bushing is advantageously a sinterable metal, especially sintered bronze. This material does not melt in the sinter procedure to a dense material but, instead, maintains a sufficient porosity. At the same time, metal compared with plastic is most often mechanically more resistant and thermally loadable. Foamed ceramics are often hard and resistant, but tend to break in the face of vibrations and thermal expansions. Therefore, application of such measuring tubes would be limited. In contrast, especially sintered bronze is quite workable. Due to the metallic ductility, vibrations do not lead to material fracture. It is especially advantageous, when the material of the support bushing is formed of small spheres, which are connected with one another by a sintering procedure, in which case the interstices between the spheres form the pores. In this way, a further improved resistance to compressive loadings can be achieved. Exactly this functionality is very important in the case of the embodiment with a sealing strip on a measuring tube. Especially preferred is when the small sintered spheres are bronze spheres. For an optimal pore size for connecting the liner, the small sintered spheres should have a diameter above 0.1 mm.

The support tube is advantageously covered, in each case, terminally with a bead of the material of the liner, in order to form a stop for a process connection. The elastic deformability of the liner effects an especially high state of sealing. Therefore, the liner can directly serve as a stop surface and under the mechanical pressure in the case of the connection of the process pipe deform in the manner of a seal. The connection surface of each terminal support bushing, with which the measuring tube is connectable to a process connection, should advantageously be covered partially or completely with the bead of liner material, in order so to provide a broad sealing surface.

The support bushing has an annular shape, with an upper and a lower annular surface 43, 44. The lower annular surface 44 is arranged within an annular recess 37 and abuts against the wall of the support tube. The upper circular area faces in the direction of a process tube to be connected. Arranged later on this upper circular area is the bead of the material of the liner. Support bushing 59 tapers narrower in the direction of the lower circular area 44. The tapering 41 effects that the lower circular area 44 is smaller than the upper circular area 43. This enables a better introduction of the support bushing 59 into the annular recess 37. Other than in the case of conventional solid metal bushings, porous material can, however, easily splinter, break or deform. Therefore, it is not trivial to provide such a tapering or similar material formations also in the case of support bushings of porous materials. In the case of sintered metals, this can be achieved by first pressing the small spheres into a shape and then connecting the small spheres with one another by thermal treatment in the sinter process.

Support bushing 59 additionally includes a peripheral leg 40, which protrudes radially from the basic body 45 in the direction of the measuring tube axis M. This leg includes a stop surface 42 for abutment with the reinforcement means 35. Leg 40, in such case, protrudes from the basic body 45 in an amount equal to the thickness of the reinforcement means—especially the sheet thickness of the perforated sheet. In this way, a unified, flush surface is achieved.

Recess 37 of the support tube 33 includes additionally a chamfer 39, which enables a better introduction of the support bushing 59 into the recess 37.

FIG. 6 shows an intermediate product 61 in the case of manufacture of a measuring tube according to FIG. 5. Included is a support tube 62 and a reinforcement means 65, which is introducible axially into the support tube 62. One sees also the helical contour, which, in this case, is introduced into the support tube 62. Reinforcement means 65 is here only schematically shown. It is actually a perforated sheet with a plurality of holes. Through the injection sockets 64 then the liner can be introduced from both sides of the reinforcement means 65, thus both between support tube 62 and reinforcement means 65 as well as also in the interior of the measuring tube on the reinforcement means 65. The liner material, in such case, penetrates into the holes of the contour of the support tube 62. In this way, there results a twist prevention of the liner in the case of simultaneous axial locking of the liner by the support bushings 59. In such case, the reinforcement means 65 is embedded in the liner material.

Figure 7:
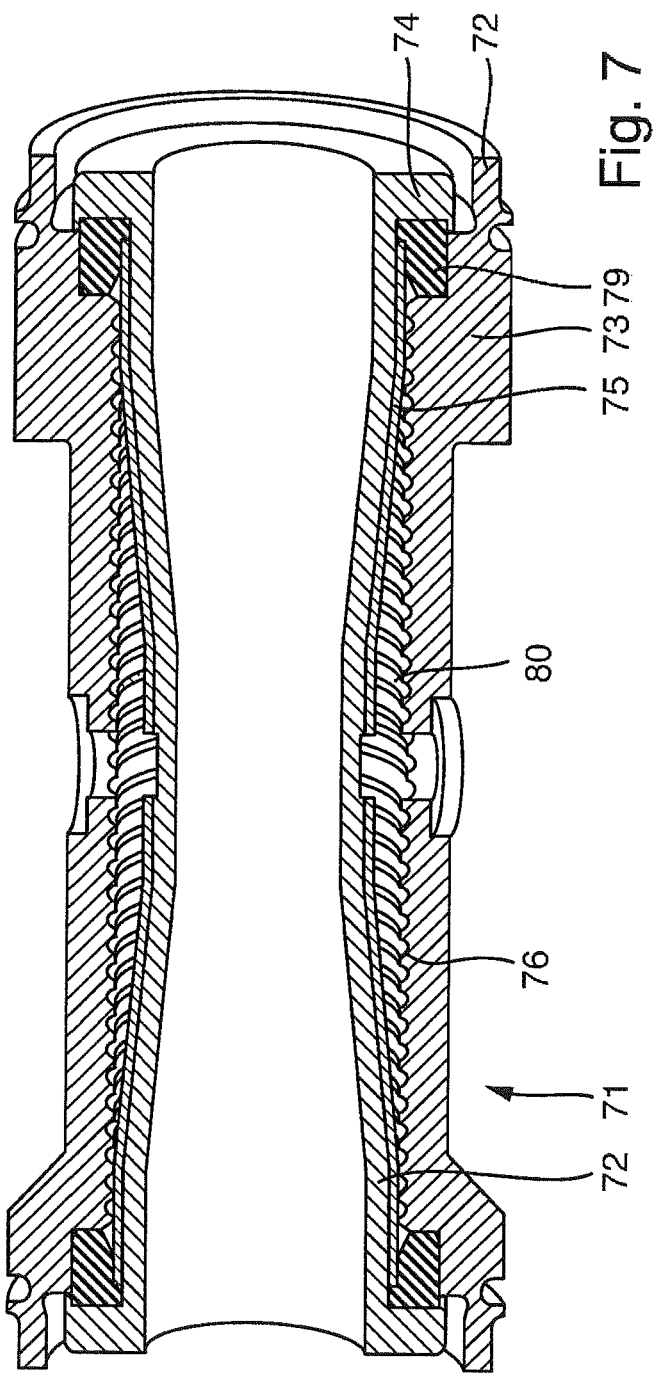
FIG. 7 is a perspective view a third embodiment of a measuring tube of a magneto-inductive flow measuring device.

FIG. 7 shows another embodiment of a measuring tube 71. This is a measuring tube with reduced measuring tube cross section. The support tube 73 has a constant inner diameter with a helical contour 76. Arranged within the support tube 73 is a reinforcement means 75. This reinforcement means has a cylindrical basic form. Different from cylindrical form, however, the inner diameter of the reinforcement means 75 lessens toward its half length. Resulting therefrom between the support tube 73 and the reinforcement means 75 is an intermediate space 80, which is filled with liner material. This intermediate space 80 is not filled in FIG. 7 for better visibility of the helical contour 76. The reinforcement means of FIG. 7 likewise includes material interruptions, e.g. holes, and, consequently, becomes surrounded with liner material. The innermost layer 72 is likewise liner material. Analogously to FIG. 5, the measuring tube 71 of FIG. 7 also includes terminal support bushings 79. These are covered with beads 74 of the liner material facing toward the process connection, in order to provide a form- and pressure stable, sealing strip. The measuring tube shown in FIG. 7 can be utilized especially for magneto-inductive flow measuring devices with short inlet section. A twist prevention of the liner is achieved in such case by the helical contour both in the end regions of the reinforcement means as well as also in the middle region.

FIG. 9 shows a further example of an embodiment of an intermediate product 81 in the case of manufacture of a measuring tube. In such case, the helical contour 86 has less recessed regions compared with the preceding examples of embodiments. This results, among other things, from the fact that in the case of this example of an embodiment the helix angle α of the helical contour is steeper. In this way, less recessed regions are available for the liner material to extend into. On the other hand, the slope of the helix angle prevents a too large tolerance range in the case of rotational action. A preferred compromise has a slope between 0.25% and 7%.

FIGS. 10 A-D shows another embodiment of an intermediate product 121 in the case of manufacture of a measuring tube. This embodiment has a basic construction analogous to that of FIG. 4. It includes a support tube 123 with a helical contour 126 on the inner surface and a reinforcement means 125 insertable therein. The reinforcement means 125 includes in contrast with the preceding examples of embodiments lateral end protrusions 130, which extend radially away from the measuring tube axis and are provided for anchoring in the helical contour. These can especially be arranged in the terminal fourths of the reinforcement means 125. In the manufacture, the reinforcement means is, first of all, pushed in up to the projections 130 and then secured by a rotary movement. In such case, the protrusions 130 engage in the helical contour 126. In this way, an additional axial, mechanical anchoring is obtained, which provides advantages for positioning the reinforcement means before the introduction of the liner.

Figure 11:
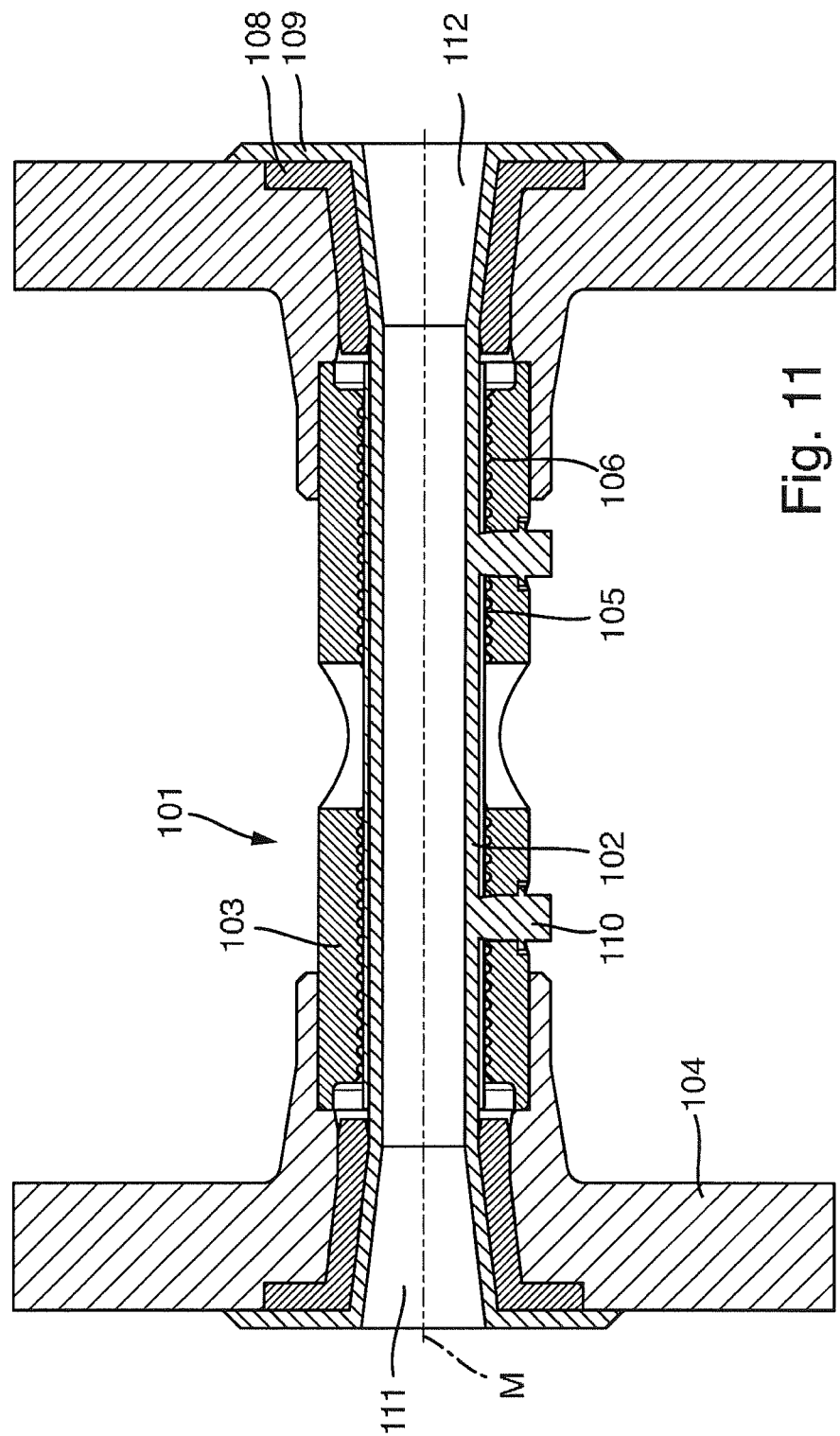
FIG. 11 is a sectional view of an embodiment of a measuring tube of a magneto-inductive flow measuring device.

FIG. 11 shows another embodiment of a measuring tube 101 for a magneto-inductive flow measuring device, in this case with an asymmetric arrangement of reference electrodes 110. The measuring tube includes inlet- and outlet regions 111 and 112 with greater in- and outlet inner diameters than in the middle region of the measuring tube. The measuring tube 101 includes a middle support tube 103 with an inner surface with helically formed contour 106 and a reinforcement means 105 arranged therein. The reinforcement means 105 has holes in it. Liner 102 connects the reinforcement means to the inner surface of the support tube 103. The middle support tube 103 transitions in front and rear regions into two welded-on flange segments 104. Liner material 109 is located on each of their process connection facing surfaces. Liner material 109 can e.g. be flared to extend 90° to the measuring tube axis M. The sealing strip in FIG. 11 is bounded, in each case, by a support bushing of compressed sintered material 108.

In the preceding examples, the liner was always arranged between the helical contour and the reinforcement means. It is, however, in the context of present invention also possible to provide the reinforcement means with an external thread and to screw the reinforcement means into the helical contour. In such case, the reinforcement means lies directly against the helical contour. The liner can, in such case, be introduced inwardly on the reinforcement means during or after the introduction, here screwing in, of the reinforcement means.

The invention claimed is:

1. A measuring tube for a magneto-inductive flow measuring device, comprising:
    a support tube;
    a liner arranged in said support tube; and
    a reinforcement means embedded in said liner, wherein:
    said reinforcement means is embodied as a cylindrical sheet with through holes;
    said support tube comprises a helical contour;
    said helical contour is incorporated into an inner surface of the support tube and forms a depression; and
    said liner is present in the depression of said helical contour.

2. The measuring tube as claimed in claim 1, wherein:
    the measuring tube has a smaller inner diameter toward a half length of the measuring tube than in an inlet or outlet region.

3. The measuring tube as claimed in claim 1, wherein:
    a recess of the helical contour amounts to at least 0.2 mm in a radial direction.

4. The measuring tube as claimed in claim 1, wherein:
    a slope of said helical contour amounts to 0.25% to 7%, wherein the slope is defined as pitch/2πr times 100%, with radius r of the support tube.

5. The measuring tube as claimed in claim 1, wherein:
    said support tube is covered terminally with one or more beads of material of said liner, in order to form one or more stops for process connections.

6. The measuring tube as claimed in claim 1, wherein:
    a connection surface of each terminal support bushing, with which the measuring tube is connectable to a process connection, is covered partially or completely with a bead of the material of said liner.

7. The measuring tube as claimed in claim 1, wherein:
    the axial movement of said reinforcement means is blocked.

8. The measuring tube as claimed in claim 7, wherein:
    the measuring tube has terminal support bushings of sintered material, which block axial movement of said reinforcement means.

9. A magneto-inductive flow measuring device having a measuring tube, comprising:
    a support tube;
    a liner arranged in said support tube; and
    a reinforcement means embedded in said liner, wherein:
    said reinforcement means is embodied as a cylindrical sheet with through holes;

said support tube comprises a helical contour;
said helical contour is incorporated into an inner surface of the support tube and forms a depression; and
said liner is present in the depression of said helical contour.

\* \* \* \* \*